(12) United States Patent
Demetriou et al.

(10) Patent No.: US 10,778,516 B2
(45) Date of Patent: Sep. 15, 2020

(54) DETERMINATION OF A NEXT STATE OF MULTIPLE IOT DEVICES WITHIN AN ENVIRONMENT

(71) Applicant: HEWLETT PACKARD ENTERPRISE DEVELOPMENT LP, Houston, TX (US)

(72) Inventors: Soteris Demetriou, Palo Alto, CA (US); Puneet Jain, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 202 days.

(21) Appl. No.: 15/698,993

(22) Filed: Sep. 8, 2017

(65) Prior Publication Data

US 2019/0081857 A1 Mar. 14, 2019

(51) Int. Cl.
```
G06F 15/177   (2006.01)
G06F 15/16    (2006.01)
H04L 12/24    (2006.01)
H04L 12/28    (2006.01)
H04L 29/08    (2006.01)
H04W 4/70     (2018.01)
```
(52) U.S. Cl.
CPC ...... *H04L 41/0816* (2013.01); *H04L 12/2827* (2013.01); *H04L 41/0893* (2013.01); *H04L 67/125* (2013.01); *H04L 67/12* (2013.01); *H04W 4/70* (2018.02)

(58) Field of Classification Search
CPC ............ H04L 41/0816; H04L 41/0893; H04L 67/125; H04L 12/2827

USPC .................................. 709/202–203, 220–222
See application file for complete search history.

(56) References Cited

U.S. PATENT DOCUMENTS

| | | | |
|---|---|---|---|
| 6,865,428 B2 | 3/2005 | Gonzales et al. | |
| 8,825,830 B2* | 9/2014 | Newton | H04L 41/0816 709/220 |
| 9,413,827 B2 | 8/2016 | Sharma et al. | |
| 9,461,976 B1 | 10/2016 | Smith et al. | |
| 9,872,150 B2* | 1/2018 | Priness | H04W 4/04 |
| 10,020,951 B2* | 7/2018 | Ram | H04L 12/1822 |
| 10,225,721 B2* | 3/2019 | Segal | H04L 67/34 |
| 2008/0271123 A1 | 10/2008 | Ollis et al. | |
| 2015/0163097 A1* | 6/2015 | Lipstone | H04L 41/0893 709/221 |

(Continued)

OTHER PUBLICATIONS

Zhang et al., "An open, secure and flexible platform based on internet of things and cloud computing for ambient aiding living and telemedicine", International Conference on Computer and Management (CAMAN), 2011.

(Continued)

*Primary Examiner* — Bharat Barot
(74) *Attorney, Agent, or Firm* — Hewlett Packard Enterprise Patent Department

(57) ABSTRACT

Examples herein relate to determining a next state in which to transition multiple IoT devices within an environment. Examples disclose determining, via operation of a state machine, a current state of the multiple IoT devices within the environment. The state machine receives contextual information. Based on the current state and the contextual information, the state machine determine a next state of the multiple IoT devices in which to transition of the multiple IoT devices within the environment.

19 Claims, 7 Drawing Sheets

(56) References Cited

U.S. PATENT DOCUMENTS

| | | | |
|---|---|---|---|
| 2016/0261465 A1 | 9/2016 | Gupta et al. | |
| 2017/0005871 A1* | 1/2017 | Smith | H04L 41/0893 |
| 2017/0039480 A1* | 2/2017 | Bitran | G06F 19/3481 |
| 2018/0242304 A1* | 8/2018 | Rong | H04W 40/20 |
| 2020/0029172 A1* | 1/2020 | Kim | H04W 4/029 |

OTHER PUBLICATIONS

Wikipedia.org, "Finite state transducer", Aug. 24, 2017, available online at <https://en.wikipedia.org/wiki/Finite-state_transducer >, 4 pages.

Ur et al., "The current state of access control for smart devices in homes", Workshop on Home Usable Privacy and Security (HUPS), Jul. 2013, 6 pages.

Tong et al.,"Fast random walk with restart and its applications", Sixth International Conference on Data Mining (ICDM'06), 2006, 26 pages.

Nambi et al., "A unified semantic knowledge base for IoT", Internet of Things (WF-IoT), 2014 IEEE World Forum on IEEE, 2014, 6 pages.

Michelle et al., "Access Control for Home Data Sharing: Attitudes, Needs and Practices", In ACM Proceedings of the SIGCHI Conference on Human Factors in Computing Systems, 2010, pp. 645-654.

Lea et al., "HyperCat: an IoT interoperability specification", 2013, available online at <http://eprints.lancs.ac.uk/69124/1/Interoperability_Action_Plan_1v1_spec_only.pdf>, 9 pages.

Kovatsch et al., "Actinium: A RESTful runtime container for scriptable Internet of Things applications", 3rd IEEE International Conference on the Internet of Things, 2012, 8 pages.

Kim et al., "Seamless integration of heterogeneous devices and access control in smart homes", Proceedings of the 2012 Eighth International Conference on Intelligent Environments, pp. 206-213.

Kim et al., "Challenges in Access Right Assignment for Secure Home Networks", HotSec. 2010, 06 pages.

Jian et al., "Mobile Crowd Sensing for Internet of Things: A Credible Crowdsourcing Model in Mobile-sense Service", IEEE International Conference on Multimedia Big Data, 2015.

Jane Yung-jen Hsu, "Crowdsourcing agents for smart IoT", Proceedings of the second international conference on Human-agent interaction, 2014, pp. 103-103.

Google.com, "Google Cloud Pub/Sub", available online at <https://web.archive.org/web/20170822181356/https://cloud.google.com/pubsub/>, Aug. 22, 2017, 3 pages.

Erik Wilde, "Putting Things to REST", School of Information, UC Berkeley, Nov. 2007, 13 pages.

Desai et al., "Semantic gateway as a service architecture for iot interoperability", Proceedings of the 2015 IEEE International Conference on Mobile Services, 16 pages.

Das et al. "Home automation and security for mobile devices," IEEE International Conference on Pervasive Computing and Communications Workshops (PERCOM Workshops), 2011, pp. 141-146.

Cherrier et al., "BeC 3: Behaviour Crowd Centric Composition for IoT applications", Mobile Networks and Applications, vol. 19, Issue 1, Feb. 2014, pp. 18-32.

Blackstock et al.,"IoT Interoperability: A Hub-based Approach," International Conference on the Internet of Things (IOT), 2014, 6 pages.

Backstrom et al., "Supervised random walks: predicting and recommending links in social networks", Proceedings of the fourth ACM international conference on Web search and data mining, ACM, 2011, 10 pages.

Alliance, "OSGi. Osgi service platform, release 3", IOS Press, Inc., 2003 available online at <https://osgi.org/download/r3/r3.book.pdf>, 602 pages.

Ahn et al., "Towards Role-based Authorization for OSGi Service Environments", Proceedings of the IEEE Computer Society Workshop on Future Trends of Distributed Computing Systems, 2008, pp. 23-29.

Aggeliki Vlachostergiou et al., "User Adaptive and Context-Aware Smart Home Using Pervasive and Semantic Technologies," Journal of Electrical and Computer Engineering, Jan. 17, 2016, pp. 1-17 [online], Retrieved from the Internet on Dec. 21, 2016 at URL: <https://www.hindawi.com/journals/jece/2016/4789803/>.

Soumya Kanti Datta et al., "oneM2M Architecture Based IoT Framework for Mobile Crowd Sensing in Smart Cities," Apr. 20, 2016, pp. 1-6.

* cited by examiner

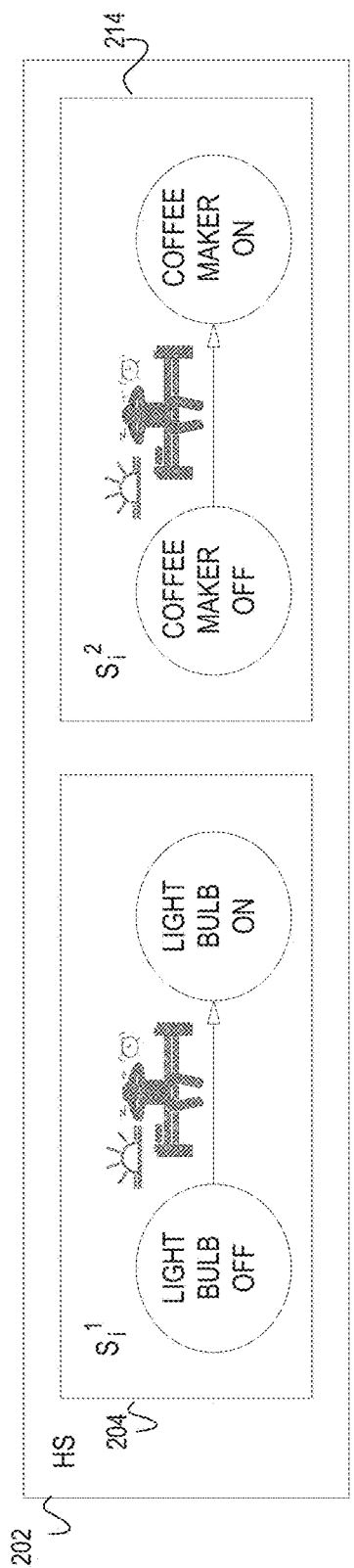
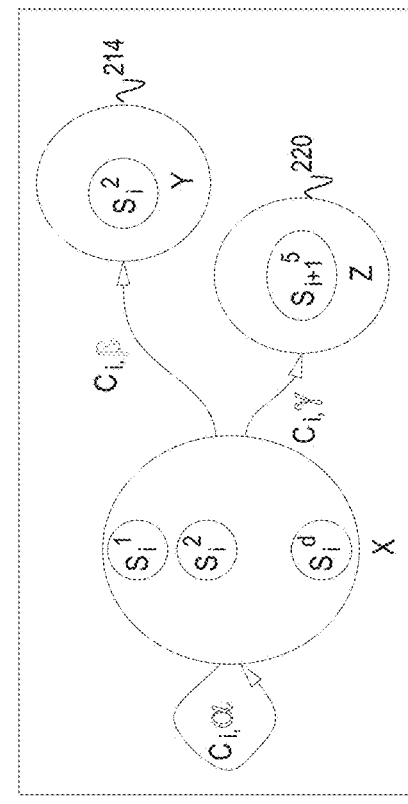
FIG. 2A
FIG. 2B
FIG. 2C

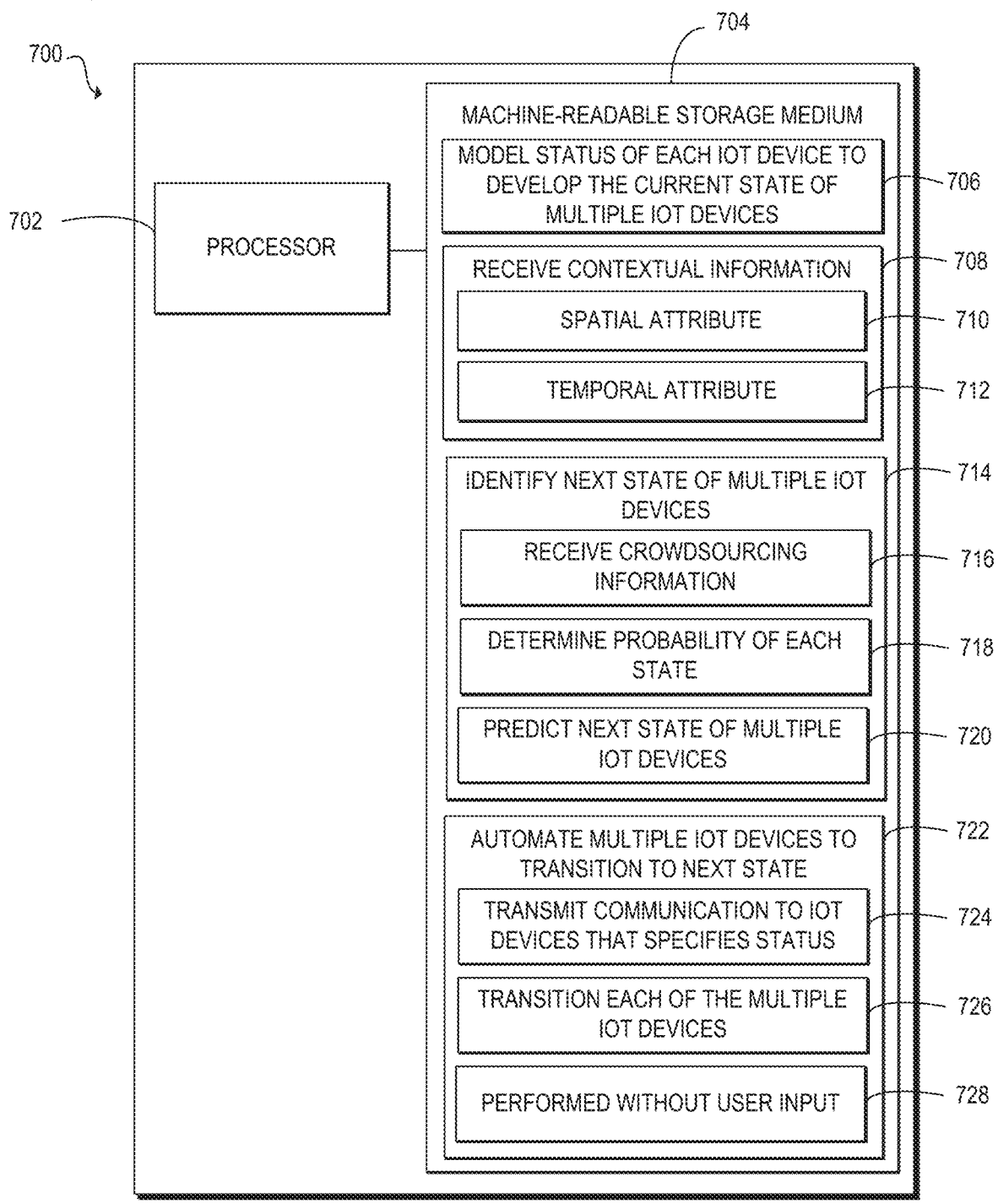

DETERMINATION OF A NEXT STATE OF MULTIPLE IOT DEVICES WITHIN AN ENVIRONMENT

BACKGROUND

In today's ever connected world, the use of Internet of Things (IoT) is set to explode over the next decade. In using IoT, physical devices are embedded with technology that provide network connectivity to enable the devices to collect and exchange data. However, there are several anticipated challenges with the explosion of IoT.

BRIEF DESCRIPTION OF THE DRAWINGS

In the accompanying drawings, like numerals refer to like components or blocks. The following detailed description references the drawings, wherein:

FIGS. 2A-2C illustrate example states of multiple IoT devices within an environment in accordance with the present disclosure;

FIG. 7 is a block diagram of an example computing device with a processing resource to execute instructions in a machine-readable storage medium for automating multiple IoT devices to transition to a next state by receiving crowdsourcing information to attain the next state in accordance with the present disclosure.

DETAILED DESCRIPTION

Figure 1:
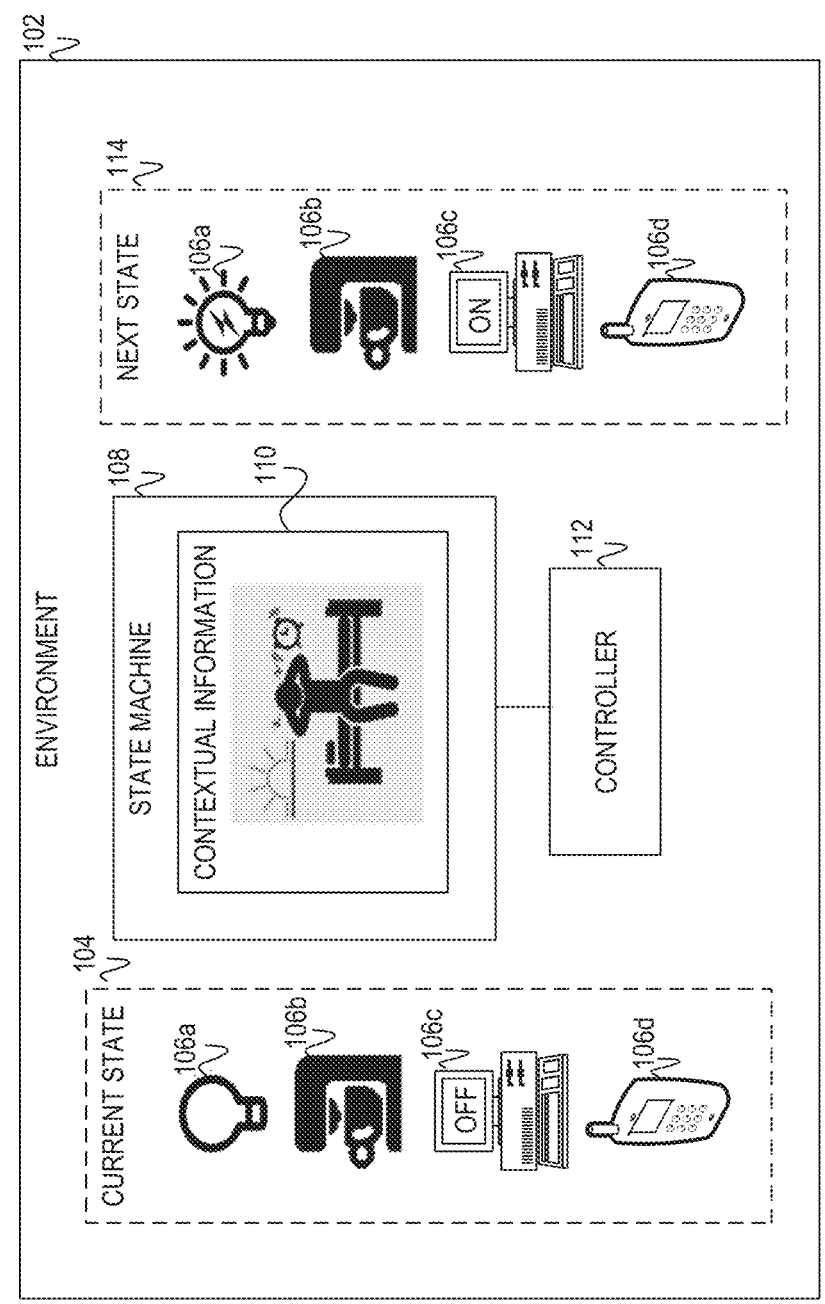
FIG. 1 is an example environment system including multiple IoT devices and a state machine to transition the multiple IoT devices to a next state in accordance with the present disclosure.

There are several anticipated challenges with the explosion of IoT. One such challenge is streamlining and automating repetitive tasks with the IoT devices. In particular, IoT devices designed for home environments use smart applications of IoT and/or user(s) to manually initiate actions for the IoT devices. For example, the IoT devices may be installed in an environment with network connections, which allows the IOT devices' manufacturers to update the device behavior and users to control remotely through an application. However, this does not the IoT devices to be fully automated nor adapt to different scenarios without user or manufacturer input. Rather, in this example, users manually instruct the IoT devices to initiate an action or pre-programs the IoT device behavior through third party applications. Using third party applications, the IoT device behavior is designed based on correlations between the IoT actions (e.g., when the motion sensor senses, turn lights on). Alternatively, these third party applications allow users to specify the correlations at a high semantic level. As such, both of these examples use input from either a manufacturer or user and is not intuitively intelligent to fully automate the IoT devices for transitions.

Accordingly, the present disclosure provides a state machine engine to model behavior or states of multiple IoT devices within an environment such as a home and/or building. Based on the states of the multiple IoT devices, the state machine receives contextual information to indicate transitions to the next states for the multiple IoT devices. Contextual information may include: a temporal attribute to infer a time characteristic; a spatial attribute to infer a user's location related to the environment; and/or notification to describe events that trigger an IoT device's status. Using contextual information to transition to the next state, provides an adaptive context aware framework that automates the various states of IoT devices within the environment.

Additionally, using a state machine to model a state of multiple IoT devices within the environment. The state machine incorporates both contextual information such as time attributes and a location of the user relative to the environment and crowdsourcing information. Using these different sources of information, the state transitions are calculated to predict which state in which to transition the multiple IoT devices. This provides an adaptive feature that allows the state transitions to change based on the information.

Further, the present disclosure also considers crowdsourcing information to determine the next state in which to transition the multiple IoT devices. Using crowdsourcing information from other participating environments fine tunes the transitional states based on correlations shared between these environments. This allows an additional intelligence layer to adjust the IoT devices to attain the next state.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. As such, these terms may be used interchangeably throughout. Additionally, the term "IoT device" is understood to be a physical device that includes a machine type of communication device and machine-to-machine communication type devices capable of network connectivity.

The foregoing disclosure describes a number of example implementations for automating multiple IoT devices within an environment. The disclosed examples may include systems, devices, computer-readable storage media, and methods for transitioning multiple IoT devices to a next state. For purposes of explanation, certain examples are described with reference to the components illustrated in FIGS. 1-7. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. For example, FIGS. 1-7 may illustrate a wired connection; however, this was done for illustration purposes as it may be understood the wired connection may comprise a wireless connection or combination thereof.

FIG. 1 is an example environment 102 including state machine 108 to determine current state 104 of multiple IoT device 106a-106d and transition to next state 114. State machine 108, coupled to controller 112, receives contextual information 110 to transitions multiple IoT devices 106a-106d from current state 104 to next state 114. Environment 102 represents a surrounding area that collects status information of multiple IoT devices 106a-106d and transitions the status of the multiple IoT devices 106a-106d. As such, implementations of environment 102 may include a home, office, location building, campus, stadium, theater, or other type of surrounding area that includes multiple IoT devices 106a-106d. Although environment 102 includes components 106a-106d, 108, and 112, implementations should not be limited as environment 102 may also include an access point for multiple IoT devices 106a-106d to gain access to a network.

Current state 104 represents a particular condition of multiple IoT devices 106a-106d within environment 102 at a specific time. As such, current state 104 further includes a status of each of multiple IoT devices 106a-106d. In this manner, current state 104 comprises various statuses of multiple IoT devices 106a-106d at the present moment. The status of each of multiple IoT devices 106a-106d is considered the position of the each device at a particular time. The status may include a standby, non-operational, low powered, off, normal operation, operational, on, etc. Each of these statuses represents the condition of each device. For example in FIG. 1, current state 104 includes the status of a light bulb 106a, coffee maker 106b, computing device 106c, and mobile device 106d. As such, in current state 104 the status of light bulb 106a is off, the status of coffee maker 106b is not brewing, computing device 106c is off, and mobile device 106d may be in standby mode. Over time, the statuses of multiple IoT devices 106a-106d may change to create next state 114. To anticipate which statuses change, state machine 108 uses contextual information to accurately predict which IoT device status will change. In a further implementation state machine 108 receives crowdsourcing information to more accurately predict which status should change and automate the transition appropriately.

Multiple IoT devices 106a-106d are physical devices that are embedded with electronics and software that provide network capability. Providing network capability allows multiple IoT devices 106a-106d to collect and exchange data over the network. FIG. 1 illustrates multiple IoT devices 106a-106d as including a light bulb 106a, coffee maker 106b, computing device 106c, and mobile device 106d; however, implementations should not be so limiting as IoT devices may include any physical device that is capable of machine type of communication and network connectivity. For example this may include a household appliance, office appliance, vending machines, printer, retail point of sale device, etc.

State machine 108 is a component that determines next state 114 of multiple IoT devices 106a-106b for transition. Initially, state machine 108 determines current state 104 of multiple IoT devices 106a-106b. Based on receiving contextual information 110 from other components 102 in environment, such as sensors, trackers, records, etc., state machine 108 identifies next state 114 of multiple IoT devices 106a-106d. In another implementation, state machine 108 also receives crowdsourcing information to determine next state 114. The crowdsourcing information is collected data from other environments representing transitions for those environments' IoT devices. This allows other information to be input for anticipating next state 114. Additionally, state machine 108 may calculate and model current state 104. In this implementation, state machine 108 models one of a finite number of states at a given time. In response to input such as contextual information 110 and crowdsourcing information, state machine 108 can change from one state (e.g., current state 104) to another state (e.g., next state 114). Implementations of state machine 108 include, electronic circuitry (i.e., hardware) that implements the functionality of the state machine 108, such as an integrated circuit, programmable circuit, application integrated circuit (ASIC), controller, processor, semiconductor, processing resource, chipset, or other type of hardware component capable of the functionality of state machine 108. Alternatively, state machine 108 may include instructions (e.g., stored on a machine-readable medium) that, when executed by a hardware component (e.g., controller 112), implements the functionality of state machine 108.

Contextual information 110 is information used to infer time and/or user's location relative to environment 102. In one implementation, contextual information 110 includes at least one temporal attribute or spatial attribute or combination thereof. The temporal attribute is a property that may be used in infer time, such as a time of day, season of year, etc. The spatial attribute is a property used to infer the user's location relative to environment 102, such as user is within environment 102 or outside of environment 102. Contextual information 110 may be provided to state machine 108 through controller 112 or other components (not illustrated) such as trackers, sensors, and/or recorders that can be used to infer information such as the time and user's location. In further implementations, contextual information 110 includes a notification that triggers modification of a status of the multiple IoT devices 106a-106d. As seen in FIG. 1, contextual information 110 may include a time (e.g., alarm clock and sun) and user's location relative to environment 102 (e.g., user in bed). In this example, in the morning, the user may have awoken and as such, multiple IoT devices 106a-106d which may have been in a powered down or off status, may power on as indicated by next state 114.

Controller 112, as coupled to state machine 108, operates in conjunction with state machine 108 to transition multiple IoT devices 106a-106d from current state 104 to next state 114. In one implementation, controller 112 executes instructs that provides the functionality of state machine 108. FIG. 1 illustrates controller 112 and state machine 108 as separate components; however, controller 112 and state machine 108 may be an integral component. Controller 112 manages state machine 108 and may include, by way of example, an integrated circuit, semiconductor, memory module, central processing unit (CPU), processing resource, application-specific integrated circuit (ASIC), controller, processor, chipset, virtualized component or other type of management component capable of managing environment 102 and/or state machine 108.

Next state 114 represents a modification of status among multiple IoT devices 106a-106d to adapt to different scenarios based on contextual information 110. As illustrated by next state 114, based on a user awakening and/or daybreak, light bulb 106a modifies status from off to on, coffee maker 106b may remain in a power off mode, computer 106c turns from off to on, and mobile device 106d may remain in standby mode. In another implementation, next state 114 may also be attained through available crowdsourcing information. This implementation is discussed in later figures.

FIGS. 2A-2C illustrate various example states of multiple IoT devices within an environment based on contextual information to adapt to different scenarios. Further, a probability for each of the various states is determined to identify a likelihood a specific environment should adapt to that state. In these figures, the various states are modeled using a finite state machine model (FSM) and using the contextual information to transition between the various IoT devices status.

For example, in FIG. 2A, the time of day and user's location can be used as contextual information to switch a status of a light bulb from off to on and a coffee maker from off to on to transition from a current state to next state. Although states 204 and 214 include a single IoT device and transition example, this was done for illustration purposes. For example, states 204 and 214 may include addition IoT devices. In each state 204 and 214, a current state and next state is represented for transitioning the respective IoT devices. Trivially assuming each device status can be modeled as a different vertex on a FSM graph would result in may disjointed graphs where a variance in the contextual information could affect transitions in one model or all models. As such, the state machine would use an edge unique to each state.

In FIG. 2A, an example smart home 202 is used as the state machine where a vertex represents various home states 204 and 214 to include the set of multiple IoT devices' statuses. The various equations below reference how the state machine model can be leveraged to automate an environment (e.g., house). Although the house environment is used, other environments could include an office, stadium, etc. As such, in a more formalized fashion, D below may represent the set of IoT devices that can be found in home 202. Additionally, let be the status i of device j and the house state (HS) 202.

$$D=\{d_1,d_2,\ldots,d_d\}, \text{ where } |D|=d$$

$$HS=\{S_i^1, S_j^2, \ldots, S_k^n\}$$

The transition between states, or a change in the house state occurs based on modifications or changes in the contextual information. A state transition function $\delta$ is a function that given a set of inputs applied on a set of states, outputs a new set of state. In this example, the set of states is the house state HS and thus $\delta$ becomes, where $\Sigma$ is the input (e.g., contextual information):

$$\delta: S \times \Sigma \rightarrow S$$

Let T denote the set of temporal attributes, L the set of spatial attributes and N the notifications that may trigger an adaption to another state, then:

$$\Sigma=\{T,L,N\}$$

Turning now to FIG. 2B, a state transition $\Sigma$ between states 204 and 214 is illustrated. Each model 216 and 218 represent the various statuses of the IoT devices within home state 202. Given a specific user, the state machine can learn over time the state transition that may apply to that specific user. If there are multiple users in given environment, then spatial attributes to infer user location and other information would be more specific to avoid conflicting behaviors.

Turning now to FIG. 2C, a modeling approach uses crowdsourcing information to predict state transitions 214 and 220 based on associated probabilities with each state transition. As discussed above in connection with FIGS. 2A-2B, a given context and current state is used to predict the next state to transition. However, for different environments, the output of the transition function can be different. As such, patterns such as human habits can be modeled as a Markov chain for the global environment, such as a global household. That is a global household state can be modeled as a random process. Further, state transitions are associated with transition probabilities. For example, the contextual information $C_i$ and initial global state X, there is a probability $\beta$ of transitioning to state Y 214 and a probability $\gamma$ of transition to state Z 220. The approach is scaled toward common behaviors, meaning the most probably states given some contextual information is similar for most people. In this regard, the approach can take a probabilistic and recommendation in the network. Global states have possible useful attributes (individual device statuses) and own contextual information. in this examples, learning techniques can be applied to the global state to learn which transition is more likely for the given environment. The probabilities associated with each state 214 and 220 can be calculated through weighting parameters or other mechanism that may take into account the given environment.

Figure 3:
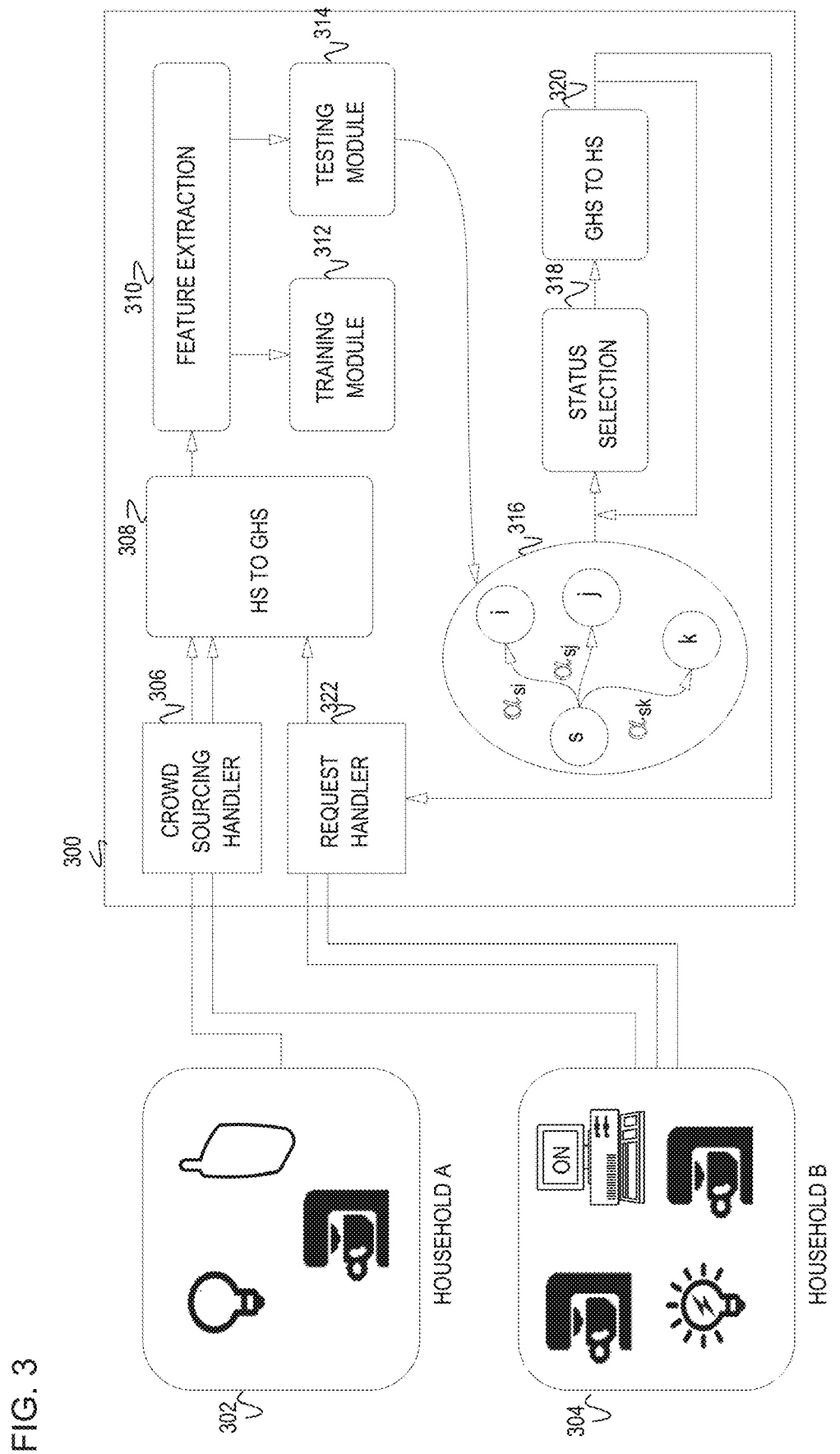
FIG. 3 is an example system to receive crowdsourcing information to transition multiple IoT devices within an environment into a next state in accordance with the present disclosure.

FIG. 3 illustrates an overall example system architecture that includes different environments 302 and 304. IoT device types, statuses, spatial attribute(s), temporal attribute(s), and other information is communicated from participating environments 302 and 304 through an overlay protocol to a hosted and managed cloud 300. This cloud 300, includes a crowdsourcing handler 306 that collects the crowdsourcing information to use as input to a home state to global home state 308 to identify the patterns that are common among environments 302 and 304. Feature extraction 310 extracts features from the collected information and uses the information to train the machine learning models seen in FIGS. 2A-2C in training module 312 and testing module 314. Testing module 314 reports information to probabilistic model 316 to predict a next state based on crowdsourcing information. Probabilistic model 316 associates a probability for each of the various states for a given environment. Status selection module 318 identifies which IoT devices' statuses should transition to achieve the next state. Based on identifying the individual IoT devices in which to transition to attain the next state, request handle 322 transmits a communication to those impacted IoT devices to transition their states.

In the example architecture, a participant may query for state transition. Thus, in one of the environments 302 and 304 given a new context (e.g., new contextual information), the environment 302 and 304 can request a new calculation to predict the next state in which to transition the multiple IoT devices. In this example, the global home state module 308 extracts the requestor's current state and contextual information. At module 308, the current state extracts the statuses of the multiple IoT devices and feeds them as testing attributes to the machine learning model 316. The model 316 ranks the edges to the various states. As such, cloud 300 finds the most appropriate state in which to transition and responds to requestor to predict the next state and transition the multiple IoT devices to attain the next state.

Figure 4:
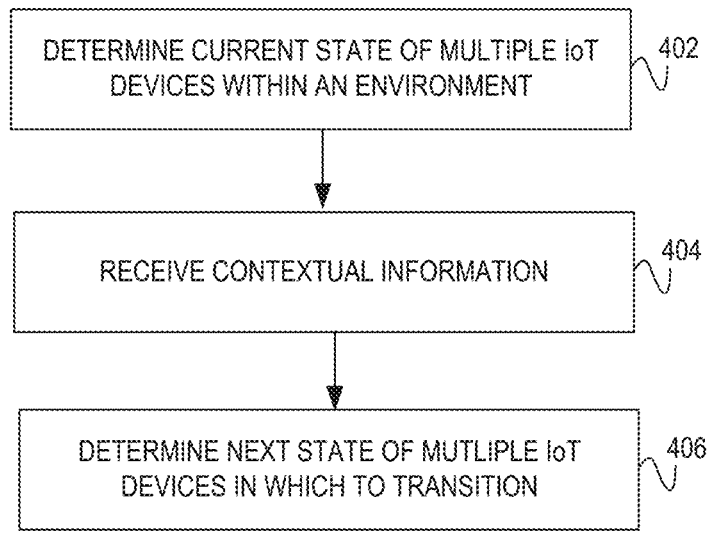
FIG. 4 illustrates an example flow diagram to determine a next state of multiple IoT devices in which to transition the multiple IoT devices in accordance with the present disclosure.
Figure 5:
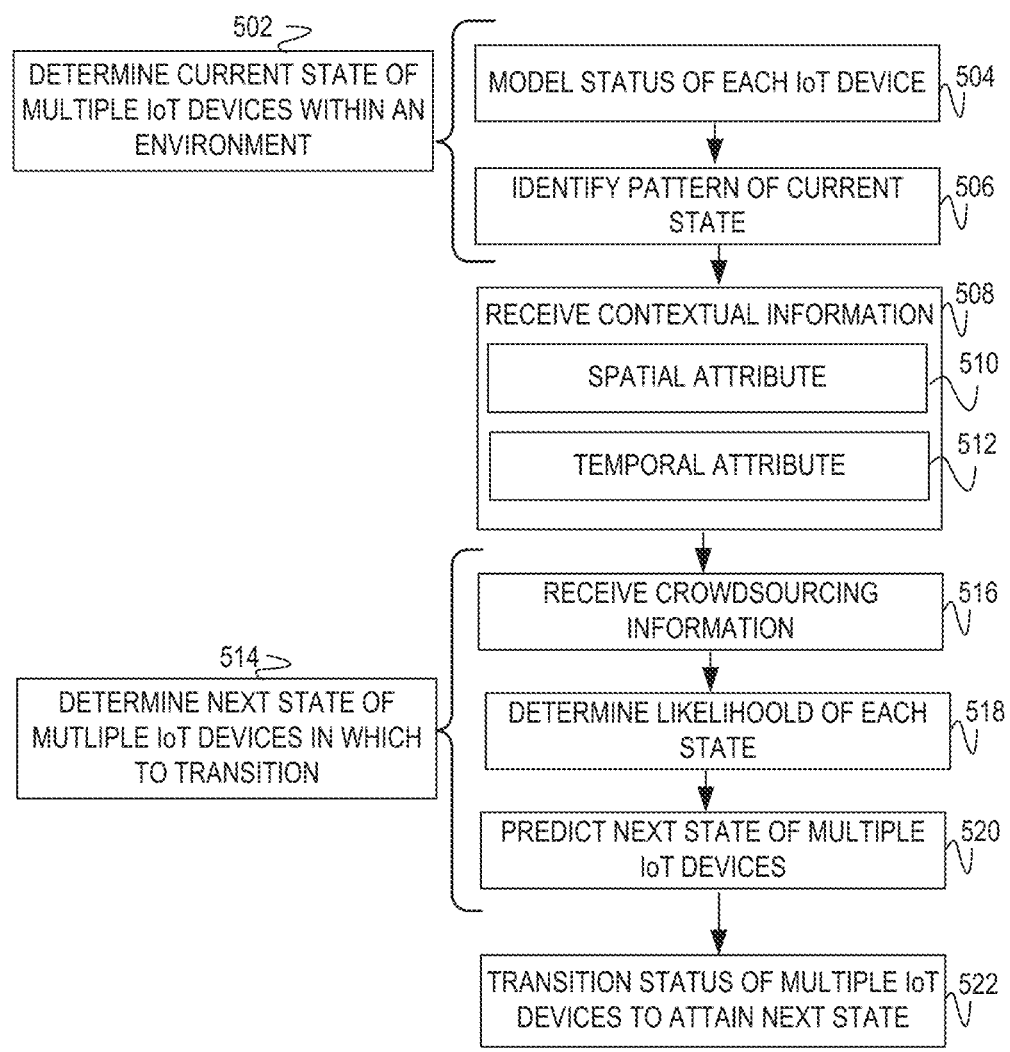
FIG. 5 illustrates an example flow diagram to determine a next state of multiple IoT devices within an environment by using crowdsourcing information in accordance with the present disclosure.

Referring now to FIGS. 4 and 5, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 4-5 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 4 is a flow diagram illustrating a method executable by a network controller to determine a next state. The determined next state is a state in which multiple IoT devices are transitioned from a current state in accordance with the present disclosure. In discussing FIG. 4, references may be made to the components in FIGS. 1-2 to provide contextual examples. In one implementation, network controller 112 as in FIG. 1 executes operations 402-406 to transition the multiple IoT devices to the next state. In another implementation, state machine 108 may operate in conjunction with network controller 112 to execute operations 402-406. Although FIG. 4 is described as implemented by network controller 112, it may be executable on other suitable hardware components. For example, FIG. 4 may be implemented in the form of executable instructions on a machine-readable storage medium 604 and 704 as in FIGS. 6-7.

At operation 402 by operation of the state machine, the current state of the multiple IoT devices within the environment is determined. The current state includes a status of each of the multiple IoT devices to comprise the current state. As such, having different IoT devices within an environment, such as a light switch, coffee maker, soda machine, etc. each may have a different status. The various statuses for the different IoT devices forms the current state. Depending on a user's location and/or time of day, these IoT devices may modify their particular statuses. In this case, the contextual information, e.g., user's location and/or time, may modify the statuses of the IoT devices to comprise the next state. For example, the presence of the user within the environment may indicate to turn on a light while the absence of the user and/or nighttime may indicate to turn off the light. In another implementation, the state machine models the current state of the multiple IoT devices by modeling the state of each multiple IoT devices. In this implementation, a state machine uses the contextual information to transition the statuses of the multiple IoT devices to attain the different states of the environment. These statuses that comprise the state between the states of an environment may change over time and/or user's presence to encompass the next state as determined at operation 406.

At operation 404, the state machine receives contextual information that includes at least one of either a spatial attribute and/or temporal attribute. As described in connection with earlier figures, the spatial attribute is a spatial feature used to infer a user's location relative to the environment. The spatial attribute may be as coarse as a user being present or absent from a particular environment, while finer location may include a user's GPS coordinates. The spatial attribute may be collected through a sensor and/or tracker to record the user's location. The temporal attribute is a feature used to infer the time. The time can be as fine-grained as a specific timestamp on a specific day of a specific month or as coarse grained as a season and/or year. In this implementation, the temporal attribute may be defined as time information including a collection of a minute, hour, day, week, season, and/or year, etc. In another implementation, the contextual information may also include a notification feature that describes events that may trigger an IoT devices status, such as a button pressed, sensor readings as motion sensed, and/or external events such as cloud notifications (e.g., weather alerts). The contextual information may be reported by sensors and/or tracking devices as input to the state machine. Using the contextual information, the state machine can anticipate the transition to the next state of the multiple IoT devices within the environment. In a further implementation, crowdsourcing information is received in addition to the contextual information to predict the next state. This implementation is explained in detail in a later figure.

At operation 406, based on the current state of the multiple IoT devices within the environment as determined at operation 402 and the contextual information received at operation 404, the state machine determines the next state. As such, the state machine transitions the multiple IoT devices within the environment to the next status to attain the next state. In this implementation, communication(s) are transmitted to the individual IoT devices to transition each status for attaining the next state. In a further implementation, the probabilities of the different states for the environment is calculated. Using these probabilities determines the likelihood for the environment to transition to that next state. In this manner, the state machine can predict the likelihood of which state to transition the multiple IoT devices to attain the next state.

FIG. 5 is a flow diagram illustrating a method executable by a networking device to determine a next state of multiple IoT devices within an environment. Based on the determination of the next state, each of the multiple IoT devices is transitioned to attain the next state. The networking device initially determines a current state by modeling a status of each of the multiple IoT devices. The networking device may proceed to receive contextual information that includes at least one of either a spatial attribute and/or temporal attribute. Based on the current state and this contextual information, the networking device proceeds to determine the next state in which to transition the multiple IoT devices. In discussing FIG. 5, references may be made to the components in FIGS. 1-2 to provide contextual examples. In one implementation, network controller 112 as in FIG. 1 executes operations 502-522 to transition the multiple IoT devices to the next state. Although FIG. 5 is described as implemented by network controller 112, it may be executable on other suitable hardware components. For example, FIG. 5 may be implemented in the form of executable instructions on a machine-readable storage medium 604 and 704 as in FIGS. 6-7.

At operation 502, the state machine determines the current state of the multiple IoT devices within the environment. In this implementation, the state machine may proceed to model the status of each IoT device that comprises the current state as at operation 504. Based on the model of the statuses, the controller operates in conjunction with the state machine to identify a pattern for each status as at operation 506. Operation 502 may be similar in functionality to operation 402 as in FIG. 4.

At operation 504, the state machine models the state of each IoT device and in turn the current state. Modeling the current state, the state machine models a state diagram as a way to describe the behavior or statuses of the multiple IoT devices. The state diagrams include a finite number of states, and based on receipt of contextual information received at operation 508, the state machine determines the current state of the given environment.

At operation 506, based on similar characteristics shared among multiple environments, the state machine can identify patterns with the similar characteristics. For example, most environments may turn on a coffee maker in the morning, thus these similar characteristics may be used to identify patterns with the status of the multiple IoT devices and thus the current state.

At operation 508, the state machine receives the contextual information. In one implementation, the contextual information includes at least one of a spatial attribute, temporal attribute, or combination thereof as at operations 510-512. The spatial attribute as at operation 510 infers a user location relative to the given environment while the temporal attribute as at operation 512 is used to infer time. Operation 508 may be similar in functionality to operation 404 as in FIG. 4.

At operation 514, based on the determined current state at operation 502 and received contextual information at operation 508, the state machine determines the next state in which to transition the multiple IoT devices within the environment. Operation 514 may be similar in functionality to operation 406 as in FIG. 4.

At operation 516, the state machine receives crowdsourcing information in addition to the contextual information. The crowdsourcing information are specific state transition in which multiple environments participate so that similar state transitions can be identified. The crowdsourcing information can include the transitions of multiple IoT devices within the given environments to identify which status should be modified based on the contextual information received at operation 508.

At operations 518-520, the likelihood of each state is determined to predict which state in which to transition the multiple IoT devices. At these operations, a probabilistic model may be used to calculate the probability or likelihood of each state. In turn, the state machine can identify which state to transition the multiple IoT devices within the environment.

At operation 522, based on determining the next state in which to transition the multiple IoT devices, the individual status of each of the IoT devices is transitioned to attain the next state. In one implementation, a handler may transmit a communication to each of the impacted IoT devices indicating a status to achieve to transition to the next state.

Figure 6:
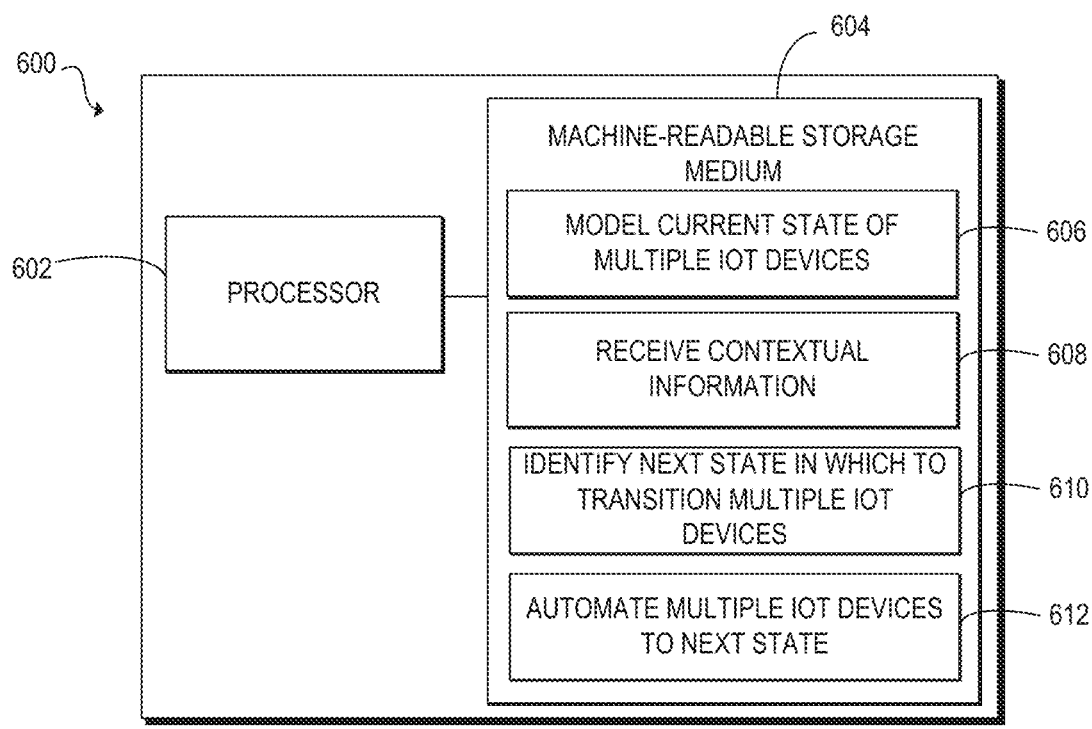
FIG. 6 is a block diagram of an example computing device with a processing resource to execute instructions in a machine-readable storage medium for identifying a next state and automating multiple IoT devices to attain the next state in accordance with the present disclosure.

Referring now to FIGS. 6-7, example block diagrams of networking devices 600 and 700 with processing resources 602 and 7602 are illustrated to execute machine-readable instructions in accordance with various examples of the present disclosure. The machine-readable instructions represent instructions that may be fetched, decoded, and/or executed by respective processing resources 602 and 702. While illustrated in a particular order, these instructions are not intended to be so limited. Rather, it is expressly contemplated that various instructions may occur in different orders and/or simultaneously with other instructions than those illustrated in FIGS. 6-7.

FIG. 6 is a block diagram of networking device 600 with processing resource 602 to execute instructions 606-612 within machine-readable storage medium 604. Although networking device 600 includes processing resource 602 and machine-readable storage medium 604, it may also include other components that would be suitable to one skilled in the art. For example, networking device 600 may include a controller, memory storage, or other suitable type of component. The networking device 600 is an electronic device with processing resource 602 capable of executing instructions 606-612 and as such embodiments of the networking device 600 include a computing device such as a server, switch, router, wireless access point (WAP), or other type of networking device. In other embodiments, the networking device 600 includes an electronic device such as a computing device, or other type of electronic device capable of executing instructions 606-612. The instructions 606-612 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-612 to transition multiple IoT devices to a next state within an environment. Specifically, the processing resource 602 executes instructions 606-612 to: model a current state of the multiple IoT devices within the environment by modeling each individual status of the multiple IoT devices; receive contextual information over the environment; identify a next state in which to transition the multiple IoT devices within the environment; and automate the multiple IoT devices to attain the next state.

The machine-readable storage medium 604 includes instructions 606-612 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 602 to fetch, decode, and/or execute instructions of machine-readable storage medium 604. The application and/or firmware may be stored on machine-readable storage medium 604 and/or stored on another location of networking device 600.

FIG. 7 is a block diagram of networking device 700 with processing resource 702 to execute instructions 706-728 within machine-readable storage medium 704. Although networking device 700 includes processing resource 702 and machine-readable storage medium 704, it may also include other components that would be suitable to one skilled in the art. For example, computing device 700 may include a controller, memory storage, or other suitable type of component. The networking device 700 is an electronic device with processing resource 702 capable of executing instructions 706-728 and as such embodiments of the networking device 700 include an electronic device such as a server, switch, router, wireless access point (WAP), or other type of computing device. Other embodiments of the networking device 700 include an electronic device such as a computing device, or other type of electronic device capable of executing instructions 706-728. The instructions 706-728 may be implemented as methods, functions, operations, and other processes implemented as machine-readable instructions stored on the storage medium 704, which may be non-transitory, such as hardware storage devices (e.g., random access memory (RAM), read only memory (ROM), erasable programmable ROM, electrically erasable ROM, hard drives, and flash memory).

The processing resource 702 may fetch, decode, and execute instructions 706-728 to transition multiple IoT devices to attain a next state. Specifically, the processing resource 702 executes instructions 706-728 to: model a status of each IoT device to represent the current state of the multiple IoT devices within the environment; receive contextual information including at least one of either a spatial attribute that identifies a user location relative to the environment and/or a temporal attribute; identify a next state of the multiple IoT devices by receiving crowdsourcing information that represents different states of IoT devices in different environments and determine a probability of each of the different states in which to transition the multiple IoT devices within the given environment; and automate multiple IoT devices such that the multiple IoT devices is transitioned from the current state to the next state, the automation occurs upon transmitting a communication to each of the multiple IoT devices that specifies the status of each of the multiple IoT devices.

The machine-readable storage medium 704 includes instructions 706-728 for the processing resource 702 to fetch, decode, and execute. In another embodiment, the machine-readable storage medium 704 may be an electronic, magnetic, optical, memory, storage, flash-drive, or other physical device that contains or stores executable instructions. Thus, machine-readable storage medium 704 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 702 to fetch, decode, and/or execute instructions of machine-readable storage medium 704. The application and/or firmware may be stored on machine-readable storage medium 704 and/or stored on another location of networking device 700.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, executable by a networking device, to automate a state transition, the method comprising:
   at a first time, determining a first state of a first Internet of Things (IoT) device within an environment, wherein the first state of the first IoT device corresponds with a temporal or spatial attribute of the environment;
   at a second time, determining a second state of the first IoT device within the environment, wherein the second state of the first IoT device corresponds with the temporal or spatial attribute of the environment;
   determining, by a state machine engine, a pattern of state transitions using the first state at the first time and the second state at the second time;
   receiving crowdsourcing information representative of different environments, wherein the crowdsourcing information identifies the pattern of state transitions in the different environments;
   based on the pattern of state transitions and the crowdsourcing information, automatically determining, at the state machine engine, a third state of the first IoT device within the environment; and
   triggering, by the network device, an adaption to the third state of the first IoT device within the environment after the second time.

2. The method of claim 1 using the pattern of state transitions and the crowdsourcing information to determine the third state of the first IoT device comprises:
   determining a likelihood of each state corresponding to each environment; and
   predicting the third state of the first IoT device based on the crowdsourcing information and the likelihood of each state.

3. The method of claim 1 wherein the at least one of the temporal attribute or the spatial attribute is used to infer a user's location relative to the environment.

4. The method of claim 1 comprising:
   transitioning the first IoT device within the environment such that the transition is performed in an automated manner to attain the third state.

5. The method of claim 1 comprising:
   modeling the third state of the first IoT device within the environment.

6. The method of claim 1, wherein the crowdsourcing information comprises information obtained from other multiple IoT devices within the different environments, the different environments comprising other physical environments.

7. A non-transitory machine-readable storage medium comprising instructions that when executed by a processing resource cause a networking device to:
   at a first time, determine a first state of a first Internet of Things (IoT) device within an environment, wherein the first state of the first IoT device corresponds with a temporal or spatial attribute of the environment;
   at a second time, determine a second state of the first IoT device within the environment, wherein the second state of the first IoT device corresponds with the temporal or spatial attribute of the environment;
   determine, by a state machine engine, a pattern of state transitions using the first state at the first time and the second state at the second time;

receive crowdsourcing information representative of different environments, wherein the crowdsourcing information identifies the pattern of state transitions in the different environments;

based on the pattern of state transitions and the crowdsourcing information, automatically determine a third state in which to transition the first IoT device within the environment; and automate the adaptation of the first IoT device within the environment from the second state to the third state after the second time.

8. The non-transitory machine-readable of claim 7 wherein to automate the adaptation of the first IoT device within the environment to attain the third state is performed without user input.

9. The non-transitory machine-readable of claim 7 wherein at least one of the temporal attribute or the spatial attribute is used to infer a user's location relative to the environment.

10. The non-transitory machine-readable of claim 7 wherein the processing resource further causes the networking device to:

identify a current state of multiple IoT devices via operation of the state machine engine.

11. The non-transitory machine-readable of claim 7 wherein the processing resource further causes the networking device to:

determine a probability of each state corresponding to different IoT devices within the different environments from the crowdsourcing information; and based on the probability of each state, predict a next state of the different IoT devices.

12. The non-transitory machine-readable of claim 7 wherein to automate the adaptation of the first IoT device within the environment to attain the third state comprises the instructions that when executed by the processing resource cause the networking device to:

transmit a communication to a second IoT device within the environment, wherein the communication specifies a fourth state for the second IoT device to transition to the fourth status.

13. The non-transitory machine-readable of claim 7 comprising instructions that when executed by the processing resource cause the networking device to:

transition each of multiple IoT devices within the environment;

automate the multiple IoT devices within the environment to attain the third state.

14. The non-transitory machine-readable of claim 7, wherein the crowdsourcing information comprises information obtained from other multiple IoT devices within the different environments, the different environments comprising other physical environments.

15. A system to automate a state transition, the method comprising:

a processor coupled to a state machine engine;

the state machine engine to:

at a first time, determine a first state of a first IoT device within an environment, wherein the first state of the first IoT device corresponds with a temporal or spatial attribute of the environment;

at a second time, determine a second state of the first IoT device within the environment, wherein the second state of the first IoT device corresponds with the temporal or spatial attribute of the environment;

determine a pattern of state transitions using the first state at the first time and the second state at the second time;

receive crowdsourcing information representative of different environments, wherein the crowdsourcing information identifies the pattern of state transitions in the different environments; and in response to the pattern of state transitions and the crowdsourcing information, automatically determine a third state in which to transition the first IoT device within the environment.

16. The system of claim 15 wherein the processor is to automate a status of each of multiple IoT devices in which to transition the multiple IoT devices within the environment to the third state.

17. The system of claim 15 wherein to determine the third state in which to transition the first IoT device within the environment, the state machine engine is to:

determine a probability of various states in which to transition the first IoT device; and based on the probability of various states, predict the third state in which transition the first IoT device.

18. The system of claim 17 wherein the state machine uses a Markov model to determine the probability of the various states.

19. The system of claim 15, wherein the crowdsourcing information comprises information obtained from other multiple IoT devices within the different environments, the different environments comprising other physical environments.

* * * * *